(12) United States Patent
Damgaard et al.

(10) Patent No.: US 12,003,930 B2
(45) Date of Patent: Jun. 4, 2024

(54) NEURAL NETWORK DRIVEN ACOUSTIC FEEDBACK DETECTION IN AUDIO SYSTEM

(71) Applicant: HL ACOUSTIC APS, Struer (DK)

(72) Inventors: Thomas Damgaard, Struer (DK); Pauline O'Callaghan, Berlin (DE)

(*) Notice: Subject to any disclaimer, the term of this patent is extended or adjusted under 35 U.S.C. 154(b) by 0 days.

(21) Appl. No.: 17/720,347

(22) Filed: Apr. 14, 2022

(65) Prior Publication Data

US 2022/0337949 A1 Oct. 20, 2022

Related U.S. Application Data

(60) Provisional application No. 63/175,127, filed on Apr. 15, 2021.

(51) Int. Cl.
*H04R 3/00* (2006.01)
*G06N 3/08* (2023.01)
*H04R 1/10* (2006.01)
*H04R 3/02* (2006.01)
*H04R 25/00* (2006.01)

(52) U.S. Cl.
CPC ............. *H04R 3/02* (2013.01); *G06N 3/08* (2013.01); *H04R 1/1016* (2013.01); *H04R 3/002* (2013.01); *H04R 25/45* (2013.01); *H04R 2410/01* (2013.01)

(58) Field of Classification Search
CPC .......... H04R 3/00; H04R 3/002; H04R 3/005; H04R 3/02; H04R 3/12; H04R 29/00; H04R 29/001; H04R 29/004; H04R 25/45; H04R 25/50; H04R 25/502; H04R 25/507; H04R 1/016; H04R 2410/01; H04R 1/1016; H04R 25/453; G06N 3/08; G06N 3/02; G06N 3/09; G06N 3/0499
See application file for complete search history.

(56) References Cited

U.S. PATENT DOCUMENTS

| | | | |
|---|---|---|---|
| 2013/0243227 A1* | 9/2013 | Kinsbergen | H04M 1/6016 381/314 |
| 2019/0132686 A1* | 5/2019 | Kuriger | H04R 25/505 |
| 2020/0053486 A1* | 2/2020 | Jensen | H04R 25/505 |
| 2022/0264231 A1* | 8/2022 | Guo | H04R 25/453 |

* cited by examiner

Primary Examiner — Thang V Tran
(74) Attorney, Agent, or Firm — JMB DAVIS BEN-DAVID

(57) ABSTRACT

A method and device for detecting acoustic feedback events with an artificial neural network in an in-ear earbud audio system that allows, by user interaction, playback of a recorded and processed signal from an environment-recording microphone by an in-ear speaker that faces or is at least acoustically coupled with the ear canal such that sound played by the speaker enters the ear canal. The audio system employs an acoustic seal that acoustically separates the speaker from the microphone, but due to external factors, the acoustical separation may not be adequate, thereby forming acoustic feedback paths. The neural network facilitates a binary classification of the time-wise segmented microphone signal, which is used to stop playback by the in-ear speaker if a feedback event is detected to protect the hearing of the user. Detection of a feedback event triggers an audible or wireless notification to be delivered to the user.

18 Claims, 5 Drawing Sheets

NEURAL NETWORK DRIVEN ACOUSTIC FEEDBACK DETECTION IN AUDIO SYSTEM

CROSS-REFERENCE TO RELATED APPLICATIONS

Benefit is claimed to U.S. Patent Application No. 63/175,127 filed on Apr. 15, 2021, the contents of which are incorporated by reference herein in their entirety.

TECHNICAL FIELD

The invention relates to detecting acoustic feedback events in audio systems consisting of at least one microphone and one speaker, and more specifically detecting said acoustic feedback events in said audio systems using neural networks.

BACKGROUND

In audio systems where a microphone signal is amplified and put out, played back or transduced by a speaker, acoustic feedback is a common problem due to the acoustic coupling between said microphone and speaker. This acoustic coupling is also referred to as a feedback path. The microphone is recording the audio produced by the speaker which in turn is produced by the speaker again, and a closed loop is thereby created. This can quickly result in a loud tonal noise that is both unpleasant to listen to but also can result in hearing damage. Many consumer in-ear earbuds allow the user to listen to their surroundings by playing potentially amplified microphone recordings with the earbud speaker. These devices can be especially sensitive to acoustic feedback since the speaker and microphone can be within a few millimetres of each other, and therefore it does not require much amplification of the microphone signal before an unstable feedback loop is created.

In many earbuds, an acoustically isolative material is incorporated into the design. This material is usually a silicon or rubber membrane that together with the user's ear canal forms an acoustic seal. This seal diminishes the acoustic coupling between the speaker and the microphone and thereby diminishes the chance of acoustic feedback from happening. The acoustic seal may however not always be working as intended. This could be due to a user not inserting the earbud correctly into his/her ear canal, the isolative material not fitting tightly against the ear canal, or the material not having adequate isolative properties. In such cases it is possible for sound to leak through the seal. Even if the user has correctly inserted the earbud, forming a strong seal between the earbud and the ear canal, movement, sweat, and other external factors may weaken the seal over time, which can increase the possibility of acoustic feedback.

In prior art, much effort has been made to suppress the acoustic feedback. That includes using artificial neural networks or other machine learning approaches to estimate a feedback path or a feedback contribution to a microphone signal, such that said contribution can be removed. Especially in the hearing aid industry, since it is a user requirement that environment audio must always be amplified and played back to the user. Even though suppression can result in decreased audio fidelity, due to imperfect estimation of the feedback path and therefore imperfect removal of the feedback contribution to the signal, it is better than the user not being able to hear at all. For the preferred embodiment, suppressing the feedback frequency is furthermore only considered as a remedy which does not solve, or partially solve, the problem of inadequate acoustic separation between the speaker and the microphone.

There exist multiple different approaches to detect feedback including tracking the input power of frequencies over time, measuring the number of zero crossings of the input signal, defining amplitude thresholds or combinations of these. It can however be difficult to tune these approaches such that a robust detector is achieved due to the amount of different scenarios a user can be located in, where the environment audio can drastically change. In the case of tracking frequencies, prolonged environmental tonal sounds may trigger the feedback detector. This could for example be squeaking bicycle brakes, people whistling, or the user listening to environmental music. Similarly, a loud environmental audio event may trigger the feedback detector, if an amplitude threshold approach is utilised. The designer of the feedback detector would need to analyse most of these environmental scenarios and accommodate them in order to achieve high robustness, which can be a difficult and time-consuming task.

Other approaches to estimate the feedback path or detecting feedback events, utilise multiple microphone setups, where one microphone is located in the ear canal with the speaker and another microphone faces or is acoustically coupled with the environment, in order to analyse the correlation between the speaker signal, the environment microphone, and the in-ear microphone. Such approaches can achieve better estimation or detection accuracy due to the extra information from the in-ear microphone, but it can still suffer from estimation errors. The two microphone signals cannot always be considered statistically independent due to their close proximity, resulting in a bias of the estimates.

Thus, an aim of the present invention is to detect acoustic feedback events caused by an inadequate acoustic seal and notify a user when an earbud is incorrectly positioned so that the user may readjust the earbud and ensure there is an adequate seal between the microphone and speaker, thus preventing acoustic feedback from occurring.

SUMMARY

Due to the desire of high fidelity in the playback of the microphone signal, the usage of feedback cancellation methods is undesirable, since inadequate estimation of the feedback path can result in degradation of the audio fidelity. This is due to overestimation of the feedback contribution which can result in elimination of energy in the signal originating from the environment audio. Similarly, underestimation of the feedback contribution can result in partial elimination of the feedback energy contribution, which can entail constant tonal artefacts in the output audio signal. Furthermore, estimating the feedback frequency incorrectly can result in removal of energy at said frequency without it causing feedback to begin with. In many cases, it is therefore more desirable to inform the user of an eventual acoustic feedback event, and ask them to either verify the quality of the acoustic seal or reduce the amplification of the microphone signal. This will ensure that the user is protected against undesirable feedback loops which could result in hearing damage and this can be achieved in a manner without degrading the audio fidelity of the earbuds.

It is desirable to detect the acoustic feedback event as early as possible, such that a user is not exposed to the loud, unpleasant, and potentially damaging tonal noise. It can however be difficult to detect acoustic feedback with high accuracy over a short period of time with traditional analysis methods, since signal contribution caused by acoustic feedback is likely to resemble signal contribution originating from a source in the environment in such a scenario.

In recent years, the increase in computational performance of computers has made it viable to explore machine learning methods. Here, a statistical model is defined and trained such that the error between the ground truth of the training data and the prediction of the model is minimised. One of such machine learning methods is neural networks. With neural networks it is possible to model complex behaviour that would not be immediately apparent otherwise, given that sufficient training data is provided and that the neural network structure is capable of modelling the underlying behaviour of the training data.

By training and deploying a neural network to an audio system that could suffer from acoustic feedback, said acoustic feedback may be detected before it becomes unpleasant. The audio stream may then be stopped and the user may be notified to validate the quality of the acoustic seal.

A first aspect relates to an audio device comprising:
a. an environment microphone configured and arranged to convert an input sound signal to an electrical input signal,
b. a speaker configured and arranged to convert an electrical output signal to an output sound,
c. an acoustic insulator that is configured to acoustically separate said environment microphone from said speaker when the acoustic insulator is fitted into an ear canal of a user,
d. an audio system comprising:
   a neural network, wherein the neural network is configured to receive and to analyze at least samples of said electrical input signal from the environment microphone and to compute an acoustic feedback event classification of said at least samples of said electrical input signal,
   a processing unit configured to receive the electrical input signal from the environment microphone and to forward an electrical output signal based on the electrical input signal to the speaker, the electrical output signal being generated by the processing unit, wherein the processing unit is configured to forward the electrical output signal based on said acoustic feedback event classification.

For example, the neural network may comprise of or be a deep neural network. Particularly, the neural network may be executed on a processor via a computer program or be implemented as a wired-electronic circuit.

According to an embodiment of the invention, said neural network is configured to compute the acoustic feedback event classification for each sample of said electrical input signal.

In an embodiment of the invention, the neural network is configured to process each sample of said electrical input signal in accordance with a network structure and/or network parameters, resulting in said acoustic feedback event classification.

According to another embodiment of the invention, said acoustic feedback event classification is a binary classification corresponding to "feedback detected" or "feedback not detected".

According to an embodiment of the invention, the audio device further comprises a user input interface configured to cause said electrical input signal to be provided to said processing unit based on an input of a user. Particularly, the input of a user may cause the processing unit to stop forwarding or not to forward the electrical output signal. More particularly, the input of a user may cause the processing unit to stop forwarding or not to forward the electrical output signal, if the binary classification corresponds to "feedback detected". Moreover, a repeated input of a user may cause the electrical output signal to be forwarded to the speaker, particularly wherein the electrical output was stopped from forwarding or not forwarded upon a previous input of a user.

In another embodiment of the invention, the processing unit is configured to generate a user notification based on said acoustic feedback event classification and to forward said user notification to said speaker.

In another embodiment of the invention, the processing unit is configured to generate the notification in case said binary classification corresponds to "feedback detected". As such, the notification may indicate to a user that the audio device is not correctly inserted into the ear canal of the user, such that a feedback loop has been formed.

In yet another embodiment of the invention, the neural network is configured such that if said binary classification corresponds to "feedback detected", the neural network causes said processing unit not to forward the input signal to said speaker.

According to an embodiment of the invention, said samples of the electrical input signal have a constant timespan. The samples may overlap in time.

For example, said processing unit may be one of: a multiple purpose processor, a digital signal processor or similar processing units.

A second aspect of the invention relates to a method for detecting and avoiding acoustic feedback events, wherein the method comprises:
a. by an environment microphone, converting a sound signal into an electrical input signal,
b. by a neural network, receiving at least samples of the electrical input signal and computing, based on said at least samples of the electrical input signal, an acoustic feedback event classification of whether an acoustic seal configured to acoustically separate said environment microphone from a speaker when the acoustic insulator is fitted into an ear canal succeeded in avoiding an acoustic feedback or not,
c. by a processing unit, receiving said electrical input signal and processing said electrical input signal, resulting in an electrical output signal and, based on the acoustic feedback event classification, forwarding said electrical output signal to said speaker and
d. by a speaker, converting said electrical output signal into an output sound signal.

Particularly, the processing unit forwards the electrical output signal depending on the acoustic feedback event classification, which may be a binary classification. Preferably, the processing unit forwards the electrical output signal to the speaker while the binary classification corresponds to the acoustic insulator being correctly fitted into the ear canal, such that no feedback paths are present. Once the binary classification corresponds to the acoustic insulator being not correctly fitted into the ear canal, such that at least one feedback path is present, the processing unit may be configured not to forward the electrical output signal to the speaker, such that no audio is played to the user.

According to an embodiment of the invention, said acoustic feedback event classification is computed on a sample of said electrical input signal with constant timespan.

In an embodiment of the invention, said set of parameters is obtained by training said neural network.

In another embodiment of the invention, said set of parameters is updated. For example, the set of parameters may be updated based on binary classifications obtained by repeatedly detecting acoustic feedback events.

According to an embodiment of the invention, said electrical input signal is provided to said processing unit based on an input of a user on an input interface.

In another embodiment of the invention, the processing unit generates a user notification based on said acoustic feedback event classification and forwards said user notification to said speaker so as to be output by the speaker.

According to an embodiment of the invention, the notification is generated in case said acoustic feedback event classification corresponds to the acoustic seal not succeeding in avoiding the acoustic feedback.

In another embodiment of the invention said notification results in said output electrical signal not being forwarded by said processing unit.

According to an embodiment of the invention, said network structure is determined before computing said binary classification.

In the following further aspects of the present inventions and embodiments thereof are stated as items. Particularly, these items may also be formulated as claims of the present application.

Item 1: An audio device comprising:
 a. an environment microphone for converting an input sound signal to an electric input signal,
 b. a speaker for converting an electrical output signal to an output sound,
 c. acoustic isolative material that acoustically separates said environment microphone from said speaker when correctly fitted into an ear canal,
 d. an analysis path which is operationally coupled to said environment microphone, for providing timewise segments of said electric input signal for analysis,
 e. a processing path which is operationally coupled to said environment microphone and said speaker, and processing said electric input signal, to provide said electrical output signal,
 f. a deep neural network, being operationally coupled to said analysis path, consisting of a network structure and a set of network parameters, for computing an acoustic feedback event classification of said timewise segments of said electric input signal,
 g. means of a user controlling whether or not said electric input signal is provided to said processing path,
 h. means of conveying notifications to said user.

Item 2: The method of item 1, wherein said deep neural network provides computing an acoustic feedback event classification for each timewise segmented electric input signal.

Item 3: The method of item 1, wherein each timewise segmented electric input signal is processed in accordance with said network structure and set network parameters, resulting in said acoustic feedback event classification.

Item 4: The method of item 3 wherein said acoustic feedback event classification is a binary classification being either "feedback detected" or "feedback not detected".

Item 5: The method of item 4 wherein a notification is generated in case said binary classification being "feedback detected".

Item 6: The method of item 4 wherein said binary classification being "feedback detected" may disconnect said processing path from said speaker.

Item 7: The method of item 1 wherein said network structure is determined before deployment to said device for detecting acoustic feedback events.

Item 8: The method of item 1 wherein said network parameters are obtained by training said deep neural network on an external device.

Item 9: The method of item 1 wherein said network parameters may be updated while said device for detecting acoustic feedback events is operating.

Item 10: The method of item 1 wherein said timewise segmented electric input signal having constant timespan and may overlap in time.

Item 11: A method for detecting acoustic feedback events comprising:
 a. an environment microphone for converting a sound signal into an electric input signal
 b. a speaker for converting an electrical output signal into an output sound signal
 c. a processor, being operationally connected to said electric input signal and said electric output signal, the processor being configured to process said electric input signal, resulting in said electric output signal, the processor further being configured to:
  i. compute a binary classification of whether said acoustic seal succeeded in avoiding acoustic feedback, by processing said electric input signal with a deep neural network,
  ii. said deep neural network consisting of a network structure and a set of parameters.

Item 12: The method of item 11 wherein said binary classification is computed on a segment of said electric input signal with constant timespan.

Item 13: The method of item 11 wherein said set of parameters are obtained by training said deep neural network on an external device.

Item 14: The method of item 11 wherein said set of parameters may be updated while in use on said processor.

Item 15: The method of item 11 wherein a notification is generated in case said binary classification being failure of said acoustic seal to avoid acoustic feedback.

Item 16: The method of item 11 wherein said processor can be a multiple purpose processor, a digital signal processor or similar processing units.

Item 17: The method of item 16 wherein said notification may result in disconnection of said output electric signal from said processor.

BRIEF DESCRIPTION OF THE DRAWINGS

In FIG. 1A, a seal of the audio device prevents sound from leaking from the speaker to the environment microphone, while in FIG. 1B, said seal is inadequate resulting in audio leakage from occurring.

DETAILED DESCRIPTION

Figure 1B:
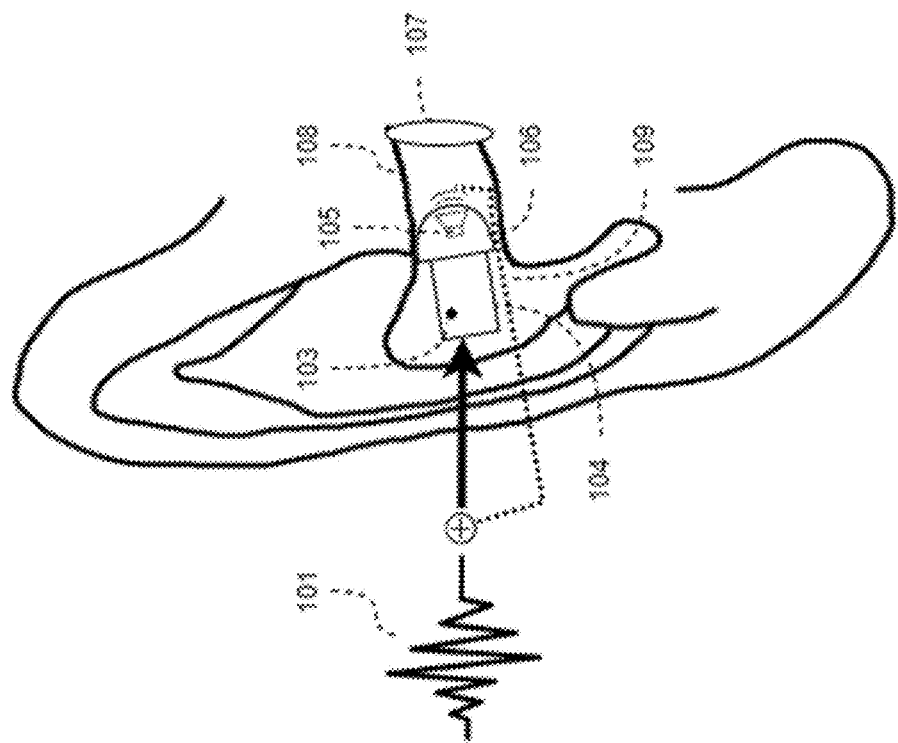
FIGS. 1A and 1B show an embodiment of an audio device inserted into an ear canal where the speaker is pointing toward the eardrum.
Figure 1A:
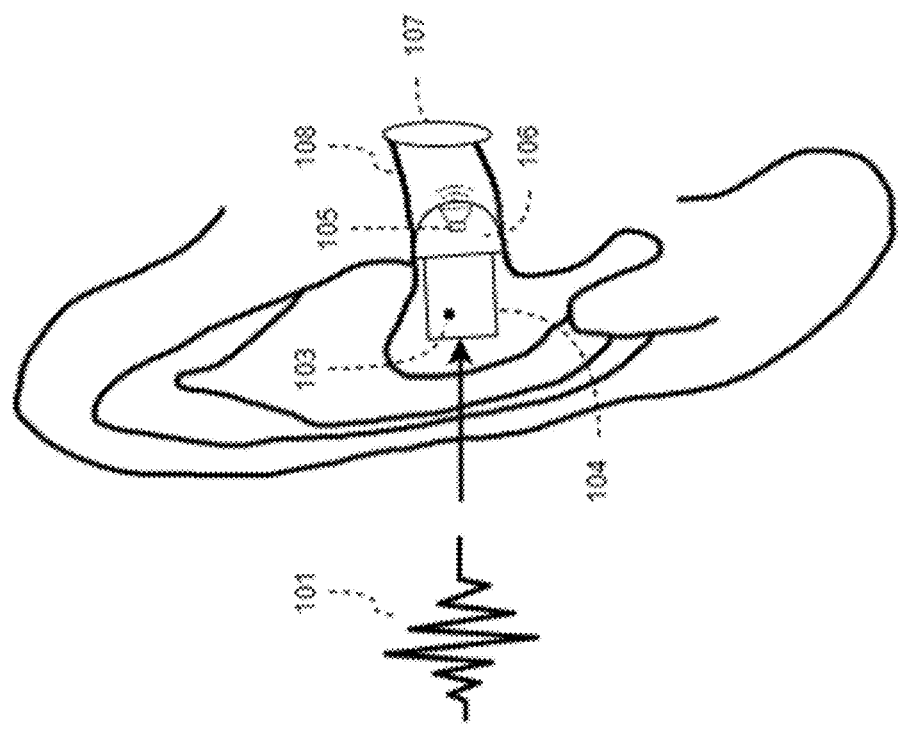

FIG. 1A shows an embodiment of an ear of a user and an audio device whereby an earbud is correctly inserted into an ear canal 108 of the ear, thus preventing formation of any feedback loop. In this embodiment, the audio device 104, is inserted into an ear canal 108. The speaker 105 of said audio device 104 is positioned within the ear canal 108 and facing the direction of the eardrum 107. An environment microphone 103 is located on the audio device 104 positioned in a manner to receive environment audio 101. Between the speaker 105 and the environment microphone 103 is an acoustic isolative material (acoustic insulator) 106 which is housed directly within the ear canal 108. The acoustic isolative material 106 is flushed against both sides of the ear canal 108 thus forming a seal. When environment audio 101 is recorded by the environmental microphone 103, this environment audio 101 will be processed, and potentially amplified, by the audio device 104 before being emitted out the speaker 105 towards the eardrum 107. The purpose of this amplification being so that a human can better hear the environment audio 101. Due to the fact that the acoustic isolative material 106 is flushed against the edges of the ear canal 108, no audio emitted from the speaker 105 will escape. The acoustic isolative material 106 therefore completely separates the speaker 105 acoustically from the environment microphone 103.

FIG. 1B shows an embodiment of an ear and audio device whereby an earbud is incorrectly inserted into an ear canal 108, which results in a formation of a feedback loop. Like with FIG. 1A, this diagram illustrates the audio device 104 inserted into an ear canal 108 where the speaker 105 of said audio device 104 is positioned within the ear canal 108 and facing or acoustically coupled with the eardrum 107, such that sound played by the speaker 105 may enter the ear canal 108 so as to be heard be a user. An environment microphone 103 is located on the audio device 104 positioned in a manner to receive environment audio 101. As with FIG. 1A there is an acoustic isolative material (acoustic insulator) 106 between the speaker 105 and the environment microphone 103 and is located within the ear canal 108.

In this case, the acoustic isolative material 106 is not positioned correctly within the ear canal 108 as it is not flushed against both sides of the ear canal 108. Environment audio 101 recorded by the environment microphone 103 and emitted by the speaker 105 will therefore leak out the ear canal 108 wherever a gap or non-seal exists. The direction or path of this feedback path may take any available route. For purposes of illustration, an example feedback path 109 is shown. As the feedback path 109 flows towards the environment microphone 103, this results in the environment microphone 103 recording the sum of the audio from the feedback path 109 and the environment audio 101.

In reality, a user may equip the audio device 104 such that the seal between the isolative material 106 and the ear canal 108 achieves strong acoustical separation between the speaker 105 and the environment microphone 103, resulting in the scenario illustrated in FIG. 1A. The level of the acoustical separation between the speaker 105 and the environment microphone 103, may however be influenced by external factors such as, for example, sweat or dirt between the isolative material 106 and the ear canal 108. The acoustic seal may also be compromised by a user moving around or touching the audio device 104. By moving around, there exists the possibility that the audio device 104 and hence the isolative material 106 will be dislodged or shifted, meaning it is no longer positioned in a flush manner against both sides of the ear canal 108. This will likely result in an acoustic pathway and hence feedback from being formed. Therefore, external factors or usage over time may in reality result in the scenario transitioning from that illustrated in FIG. 1A to that of the scenario illustrated in FIG. 1B or vice versa.

It remains possible that a scenario between those illustrated in FIG. 1A and FIG. 1B exists, namely whereby the audio device 104 and isolative material 106 is correctly positioned in the ear canal 108, however a small amount of sound produced by the speaker 105 is leaking through the acoustic seal created between the isolative material 106 and the ear canal 108, but at such a low sound level that no acoustic feedback event is created.

Figure 2:
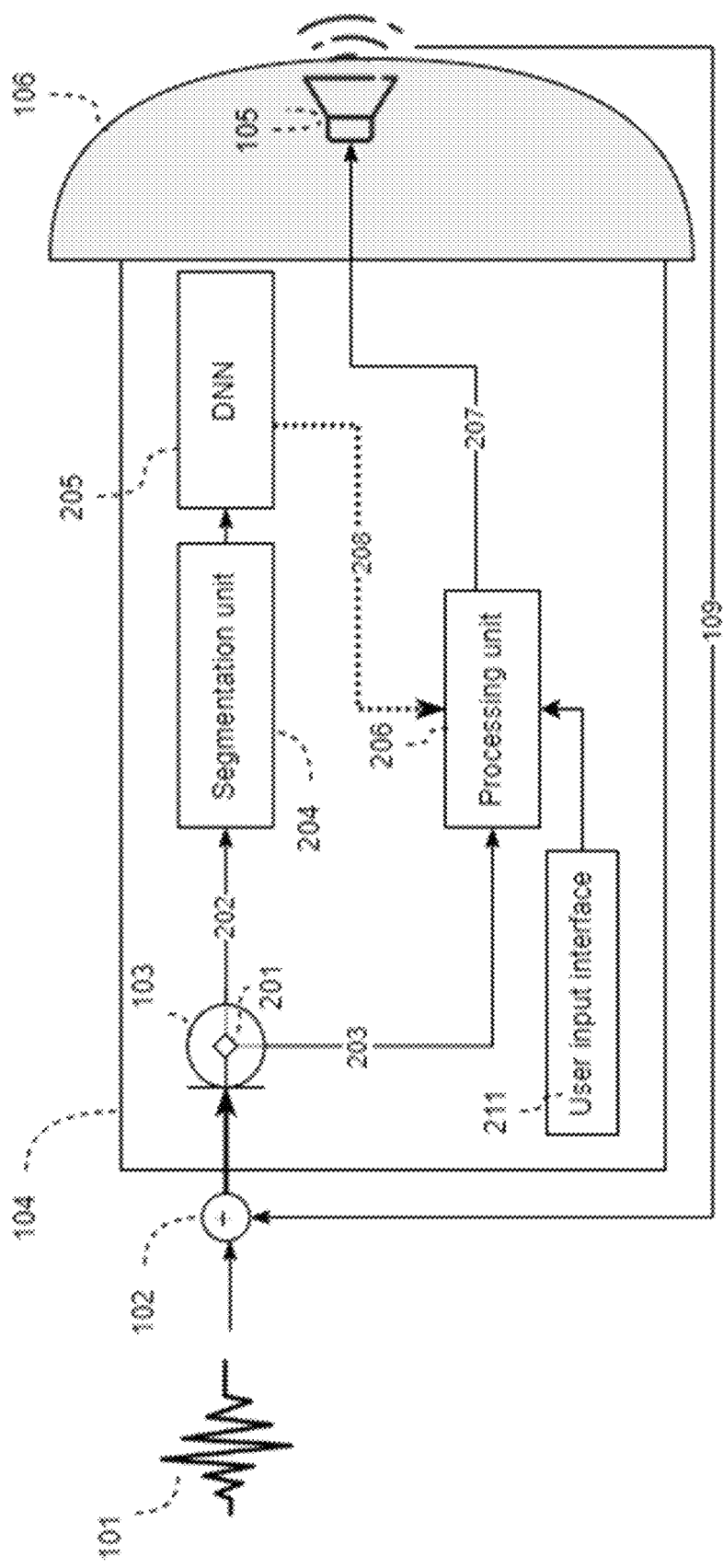
FIG. 2 shows an embodiment of the audio system of the current invention, with illustration of a feedback path.

FIG. 2 shows an embodiment of a block diagram of an audio system 104. The audio system 104 is equipped with acoustic isolative material 106. An environment microphone 103 and a speaker 105 are located on said audio device audio device 104. Said environment microphone 103 is configured to record an available environment audio 101 signal and to convert said environment audio 101 signal into an electrical input signal 201. The electrical input signal 201 is supplied to an analysis path 202, and a processing path 203, essentially splitting the electrical input signal 201 into two identical copies. This allows for said processing path 203 to alternate its copy of the electrical input signal without it having any influence on the copy of the electrical input signal on analysis path 202, and vice versa. It is to be understood that when referencing the electrical input signal 201, it can mean the electrical input signal 201 supplied to the analysis path 202 or the electrical input signal 201 supplied to the processing path 203 depending on the context. This abstraction is made to ease the readability.

The processing path 203 is operationally connected to the Processing unit 206, making it possible to apply desirable alterations to the electrical input signal 201 supplied by the processing path 203. In various embodiments, the Processing unit 206 can for example be implemented as a general purpose processor, a digital signal processor, an electrical circuit or a combination of these. It is to be understood that the presented examples of Processing unit 206 is a non-exhaustive recitation, and that other embodiments of the audio system 104 may use other implementations of the Processing unit 206. The alteration applied to the electrical input signal 201 by the Processing unit 206, can consist of a multiplum of operations such as signal level amplification or attenuation, signal spectrum alteration, signal noise removal or other types of signal processing methods. It is to be understood that the listed operations applied to the electrical input signal 201 by the Processing unit 206 is non-exhaustive, and that various embodiments may apply any desirable operation or multiplum of operations.

By applying alterations to the electrical input signal 201 with the Processing unit 206, an electrical output signal 207 is created. The electrical output signal 207 functionally connects the Processing unit 206 with the speaker 105. The speaker 105 converts the electrical output signal 207 to an acoustic output signal which is audible to the user.

The audio device 104 also comprises a user input interface 211 that allows for a user to control the audio device 104 by means of physically interacting with the User input interface 211. The User input interface 211 is functionally connected to the Processing unit 206. The User input interface 211 is configured to control whether the processing path 203 is connected or disconnected from the Processing unit 206 which either allows or does not allow processing of the electrical input signal 201 respectively. The User input interface 211 will thereby implicitly either allow or not allow for environment audio 101 to be played back by the speaker 105. In the preferred embodiment, the User input interface 211 is a physical and user accessible button that toggles the playback of environment audio 101 by the speaker 105. Other embodiments may implement the User input interface 211 as a switch, touch sensor or other types of user interactive interface.

Figure 3:
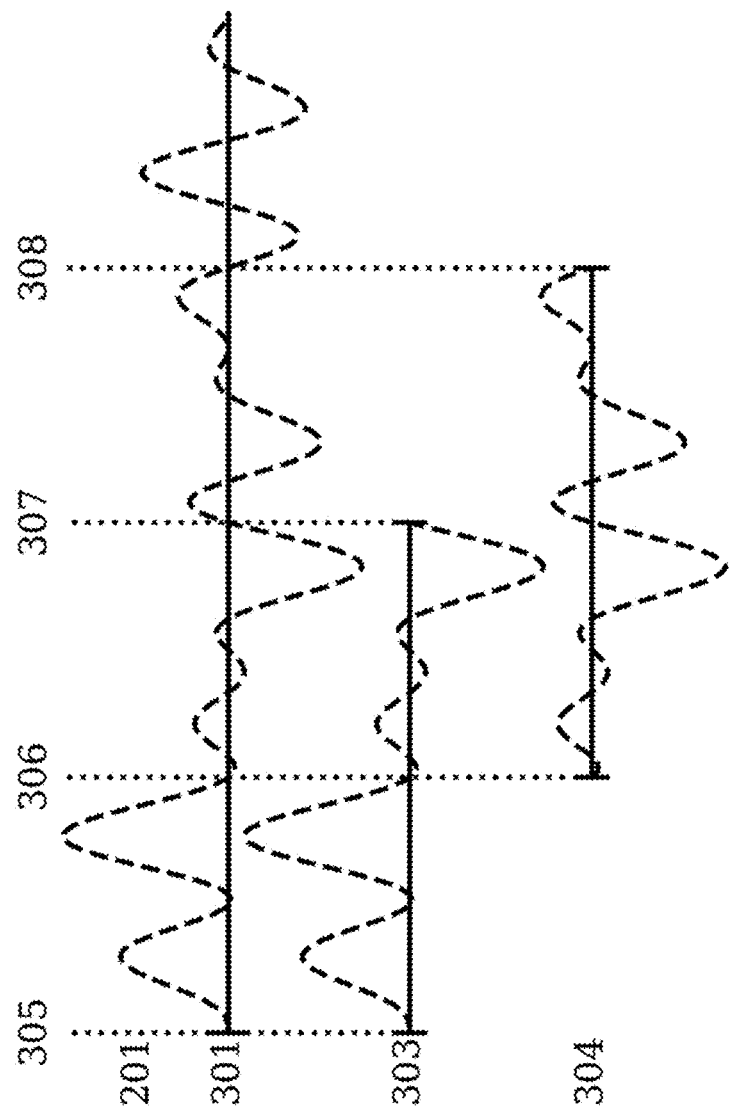
FIG. 3 shows an embodiment of segmentation of the electrical input signal in time to obtain samples. For illustrative purposes, only two samples are shown, but it is to be understood that the segmentation is performed continuously on the electrical input signal, as long as said signal is provided.

The analysis path 202, is functionally connected to a Segmentation unit 204, which makes the electrical input signal 201 available to said Segmentation unit 204. The Segmentation unit 204 timewise segments the electrical input signal 201 into samples. For explanatory purposes, the segmentation of the electrical input signal 201 is illustrated in FIG. 3. The segmentation into samples is performed on an electrical input signal 201, illustrated with a dashed line across the time axis, 301. Here the timespan of each frame, also called sample size, is constant and determined before deployment of the audio device 104 into the ear canal 108, but different embodiments may utilise different sample sizes. The sample size is illustrated, for example, as the timespan between 305 and 307 or the timespan between 306 and 308. Choosing the sample size is a trade-off between detection latency and potentially detection confidence. This is due to longer samples requiring longer time to pass before said sample can be analysed for feedback events, but a longer sample size may increase the detection confidence since feedback becomes a more dominant part of the signal as time progresses, given that a feedback event is preset.

Therefore, embodiments may utilise timewise overlapping samples, such that part of the electrical input signal 201 present in one sample is also present in the subsequent sample. This can be seen as the later half of the signal (between 306 and 307) of sample 303 is also present as the first half (between 306 and 307) of the signal of sample 304. The timewise amount that subsequent samples overlap may be determined before deployment, but may vary from one embodiment to another. This allows for large time duration per sample with low latency between the availability of subsequent samples. This will however increase the computational load, due to the need of analysing large samples frequently.

Each sample produced by the Segmentation unit 204 is now classified by the neural network 205 as they become available. The neural network 205 comprises a network structure and a set of network parameters. Before deployment, the network structure is preferably specified. A network structure comprises an input layer, a number of hidden layers, an output layer and activation functions for each of the layers. Each of the layers comprises a chosen number of nodes, where each node in one layer is preferably connected to all nodes in the next layer with a scale factor, each node furthermore comprises a bias and an activation function. The value of a node can be calculated as: $y_i = \sigma(a_i x + b_i)$, where $y_i$ denotes the i'th node in a layer, $x \in R^{N \times 1}$ denotes all N nodes in the previous layer, $a_i \in R^{1 \times N}$ denotes the N scale factors connecting x and $y_i$, • denotes a dot product, $b_i$ denotes the bias of the i'th node in a layer, and $\sigma()$ is the, preferably non-linear, activation function. The set of network parameters comprises the scale factors and the biases, whose values are found when training the neural network 205. The activation function is preferably determined before training, and may vary between embodiments and even between layers.

The nodes of the output layer may correspond to the output classes of the detector, which can correspond to 'Feedback detected' and 'Feedback not detected'. The number of nodes in the output layer can be defined in multiple ways. There can for example be a node for each of the two classes, where the node with largest value after a classification is considered the classification result. Another embodiment may use a single node where its value after classification is mapped to either one or zero, by for example rounding to the nearest. Here a value of zero could correspond to 'Feedback not detected' and a value of one could correspond to 'Feedback detected'.

Upon a sample being classified corresponding to 'Feedback detected' by the neural network 205, the preferred embodiment will stop environmental audio 101 being played back to the user via the speaker 105. This is done by the neural network 205 signalling the Processing unit 206 via the signal path 208 upon detection of a feedback event, whereafter the Processing unit 206 disconnects from the processing path 203. This is to avoid the feedback event causing damage to the user's hearing. Hereafter, the user is notified that a feedback event has been detected by the neural network 205. Different embodiments may use different means of notifying the user of detected feedback events. The notification may be delivered to the user in the form of an audio prompt generated by the processing unit 206.

Figure 4:
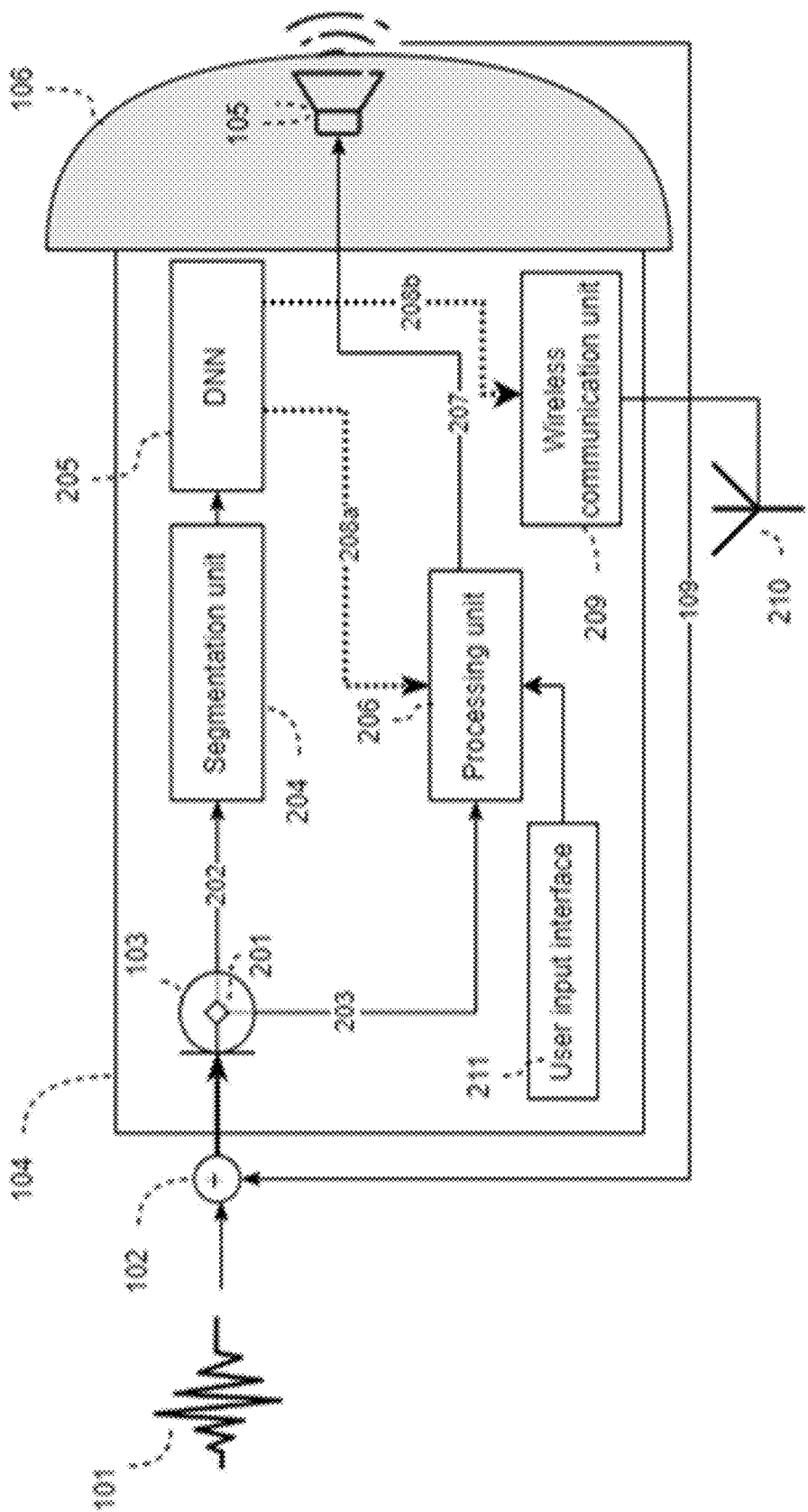
FIG. 4 shows an embodiment of a block diagram of the audio system of the current invention, with illustration of a feedback path and wireless communication capability.

FIG. 4 illustrates an embodiment of FIG. 2 with added wireless communication capability, allowing the audio device 104 to send and receive data to or from external wirelessly connected devices through wireless communication channels. To this end, the neural network 205 may be configured to communicate with the Processing unit 206 via a first signal path 208a as well as with the wireless communication unit 209 via a second signal path 209b. Wireless communication with surrounding wirelessly connected devices may be handled by a Wireless communication unit 209, which is functionally connected to an antenna 210. The Wireless communication unit 209 may furthermore be connected to the neural network 205 via the second signal path 208b, such that a detection of a feedback event may trigger a notification being generated and transmitted through a wireless communication channel by the Wireless communication unit 209 to surrounding wirelessly connected devices. Other embodiments may also combine the use of notification through audio prompts and notifications through wireless communication given that the embodiment is capable of both. Embodiments may also use the wireless communication capability alongside the User input interface 211, in order to control whether environment audio should be played back by the speaker through a wireless communication channel.

In a preferred embodiment, the processing path 203 will not be reconnected to the Processing unit 206. In order to resume playback of environment audio 101 through the speaker 105, the user must first ensure that an acoustic seal between the isolative material 106 and the ear canal 108 exists. This is to avoid environment audio 101 being played back by the speaker 105 if the feedback path 109 exists. The confirmation given by a user that the seal has been re-established can be applied through the User input interface 211, or by an external wirelessly connected device transmitting the user confirmation to the audio device 104 given that the embodiment is capable of such.

Other embodiments may require additional confirmation that a feedback path 109 is present and causing feedback events in order to avoid taking action on false detections. Here it could be required that a number of consecutive classifications by the neural network 205 all corresponding to 'Feedback detected', or incorporate a majority voting scheme, where the majority of a predefined number of consecutive classifications by the neural network 205 dictates the presence of a feedback event. Using a majority voting scheme can generally improve the robustness of the voted classification, since a feedback event usually will be present over a prolonged period of time. Requiring that a number of consecutive classifications by the neural network 205 all being 'Feedback detected' may however increase the latency between the beginning of the feedback event and the processing path 203 being disconnected from the processing unit 206.

Before deployment of the audio system 104, the neural network 205 may be trained on training data with known ground truth, resulting in a set of parameters that minimises misclassification of feedback events in the training data. In order for the neural network 205 to correctly classify feedback events after deployment, training data that adequately represents the feedback phenomenon is preferred. It is in general advantageous to train the network 205 with a wide variety of scenarios, meaning different feedback paths, environment audio, variation in the alterations applied to the recorded audio etc. This increases the network's robustness, and can result in a better statistical model of feedback phenomenon. Training data can be gathered through recordings, simulations, and/or a combination of the two.

After deployment of the neural network 205, training the network is still a possibility. In embodiments incorporating post-deployment training and means of accessing the network parameters remotely, additional training can be performed on an external device such as a phone or a computer server, whereafter the new set of network parameters is preferably transmitted to the audio device 104. If the embodiment has wireless communication capability, the new network parameters can be transmitted wirelessly. Similarly, wired transmission can be possible if the embodiment has a wired interface.

In a preferred embodiment, the audio samples produced by the Segmentation unit 204 and supplied to the neural network 205 are not transformed to other domains or otherwise pre-processed before being classified by the neural network 205. In other embodiments the audio samples may be transformed to the frequency domain, there may be calculated a cross-correlation between audio samples, or performed other types of pre-processing. It should be noted that the neural network 205 may be configured to learn these operations given that an adequate network structure is chosen, but it can be more computational efficient to perform the operations manually as pre-processing before the neural network 205 classifies the transformed audio frame.

Figure 5:
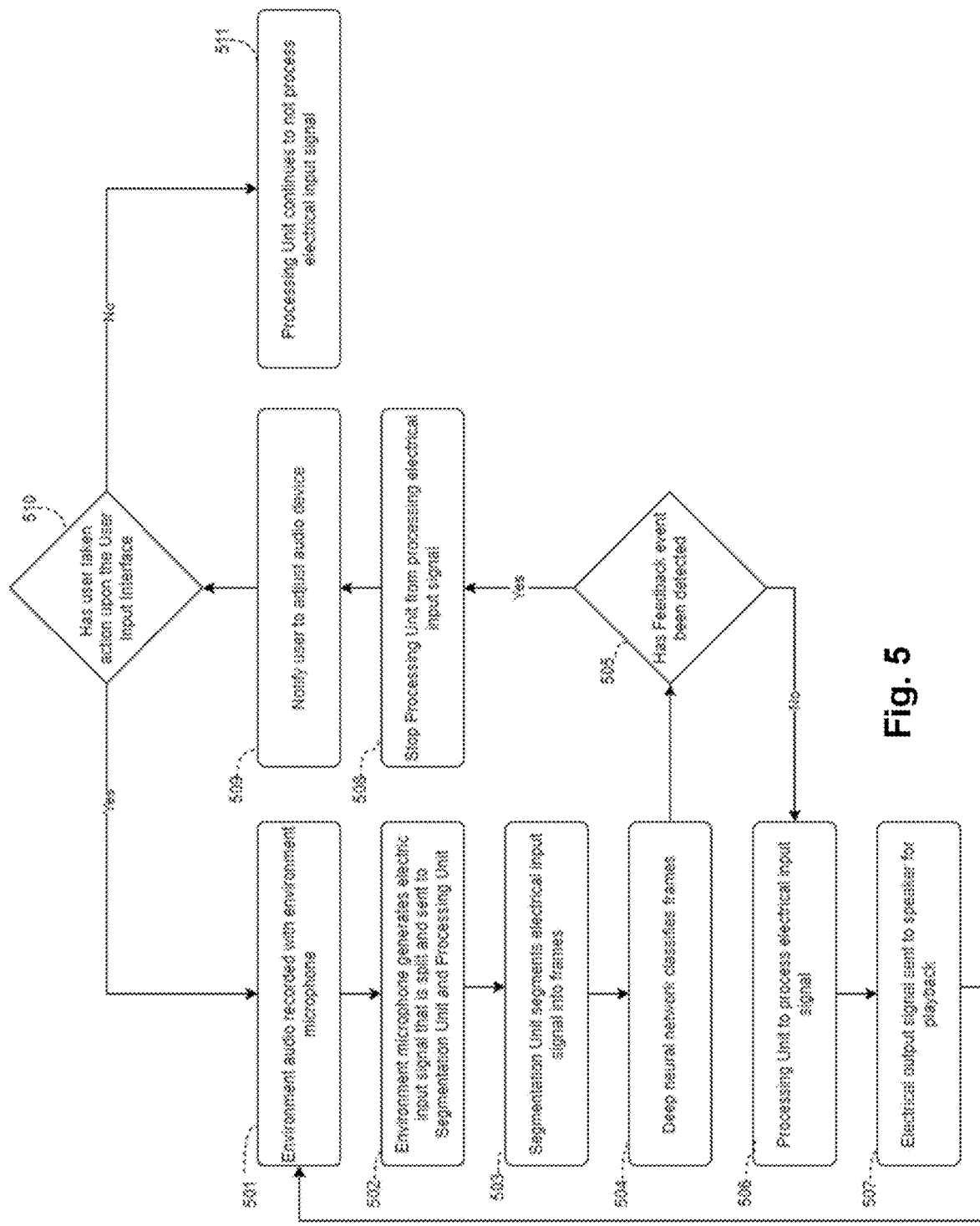
FIG. 5 shows an embodiment of an instruction describing the flow of operations of the invention.

FIG. 5 shows a decision flowchart whereby it can be further understood in what circumstances the described invention may operate. As is now known, at step 501, environment audio 101 is recorded via an environment microphone 103 affixed to the audio device 104.

At step 502, the environment audio 101 is recorded and converted by the environment microphone 103 into an electrical input signal 201. This signal is sent along two paths, whereby the first signal is processed by a Segmentation Unit 204 and the second signal is processed by the Processing Unit 206.

At step 503, the electrical input signal 201 that was sent to the Segmentation Unit 204, as described above, is being segmented into samples. The exact manner that this takes place has already been described above.

At step 504, and quite integral to this invention is the use of neural network 205 which classify each of the samples referred to above. At this point the neural network 205 may determine if feedback is present 505 with reference to the samples.

If no feedback is detected, then operation of the audio device 104 occurs as normal, as set out in step 506. If there is no feedback detected, then the Processing Unit 206 will continue to process the electrical input signal 201, thus causing it to be heard via the speaker 105 for playback, as depicted in step 507.

This process may continually loop, meaning that even after the neural network 205 has determined there is no feedback, it will continue to process audio until feedback is detected, in which case this leads to step 508. Steps 501 to 504 may therefore keep repeating.

At step 508, feedback has been detected and this results in playback from the speaker 105 stopping as a result of the Processing unit 206 no longer processing the electrical input signal 201. The neural network 205 informs the Processing unit 206 via the signal path 208 or the first signal path 208*a* that a feedback event is detected, in which case the Processing unit 206, stops processing and no more sound is produced.

The user may be notified about this feedback at step 509, whereafter they are expected to take action to remedy such feedback. Action can be taken on the User Input Interface 211 which the user can physically control.

Should the user choose to take no action and not engage the User Input Interface, as demonstrated at step 510, then the Processing Unit 206 will not process any electrical input signal 201 thus resulting in no audio output being generated by the speaker 105, as demonstrated at step 511. Simply put, the user will not hear anything.

If the user does take action, then the entire process as defined in steps 501 to 505 will repeat. The user will only be able to hear sound once there is no feedback event, in other words, step 506 can only occur provided there is no feedback.

It is the user's responsibility to ensure that the audio device 104 is correctly positioned to ensure that there is no feedback event. Should the user take action on the User Input Interface 211, without having adjusted the audio device 104, then the feedback loop 109 still exists meaning that at step 505, the response will remain "yes" which will result in steps 508 and 509 as described above, from occurring. With this disclosed invention, it is therefore essential for the user to take positive action to remedy the feedback loop 109. This is necessary to reduce any hearing damage that could occur should the user not take any positive action.

In recent years, in-ear earbuds with environment facing microphones, which allow playback of the microphone recording, are becoming more common. This allows for the wearer to listen to their surroundings while they, for example, are listening to music or listening to an altered version of the environmental sound, for example, by accentuating certain frequencies to suit their needs. As mentioned, these devices can suffer from acoustic feedback in the case that an inadequate seal is formed between the earbud and the ear canal. This could, for example, happen if the user brushes their hair away from their ear and accidentally bumps the earbud, thus loosening the fit of the earbud and creating a feedback path. In the case of a feedback event, a user can be exposed to loud and potentially damaging sound. To protect the hearing of the user, it is therefore important to implement a mechanism that automatically stops the playback of environmental audio in the case of a feedback event. To educate the user of why the playback of environmental audio was stopped, the user must be notified of the detected feedback event, and which actions to take in order to enable the playback anew.

CONCLUSION

A device for detecting acoustic feedback events in audio systems driven by a neural network has been presented. It allows for detection of acoustic feedback events and stopping playback of environment audio, potentially avoiding hearing damage for users. By employing a neural network a robust classifier, that functions well with a large variety of environmental audio, can be achieved, thereby not limiting the scenarios in which a user confidently can rely on the device. It is emphasised that all illustrations and the explained subject matter should be interpreted as examples of embodiments and not as exhausting the subject matter.

We claim:

1. An audio device comprising:
   a. an environment microphone configured and arranged to convert an input sound signal to an electrical input signal,
   b. a speaker configured and arranged to convert an electrical output signal to an output sound,
   c. an acoustic insulator that is configured to acoustically separate said environment microphone from said speaker when the acoustic insulator is fitted into an ear canal of a user,
   d. an audio system comprising:
      a neural network configured to receive and analyse at least samples of said electrical input signal from the environment microphone and to compute an acoustic feedback event classification of said at least samples of said electrical input signal,
      a processing unit configured to receive the electrical input signal from the environment microphone and to forward an electrical output signal based on the electrical input signal to the speaker, the electrical output signal being generated by the processing unit, wherein the processing unit is configured to forward the electrical output signal based on said acoustic feedback event classification,
   wherein said acoustic feedback event classification is a binary classification corresponding to "feedback detected" or "feedback not detected".

2. The device of claim 1, further comprising a user input interface configured to cause said electrical input signal to be provided to said processing unit based on an input of a user.

3. The device of claim 1, wherein the processing unit is further configured to generate a user notification based on said acoustic feedback event classification and to forward said user notification to said speaker.

4. The device of claim 1, wherein said neural network is configured to compute said acoustic feedback event classification for each sample of said electrical input signal.

5. The device of claim 1, wherein the neural network is configured to process each sample of said electrical input signal in accordance with a network structure and/or network parameters comprising said neural network, resulting in said acoustic feedback event classification.

6. The device of claim 1, wherein the processing unit is configured to generate a user notification in case said binary classification corresponds to "feedback detected".

7. The device of claim 1, wherein the neural network is configured such that if said binary classification corresponds to "feedback detected", the neural network causes said processing unit not to forward the input signal to said speaker.

8. The device of claim 1, wherein said samples of the electrical input signal have a constant timespan.

9. The device of claim 1, wherein said samples of the electrical input signal overlap in time.

10. The device of claim 1, wherein said processing unit is one of: a multiple purpose processor, or a digital signal processor.

11. A method for detecting and avoiding acoustic feedback events, wherein the method comprises:
    a. converting a sound signal into an electrical input signal with an environment microphone,
    b. receiving at least samples of the electrical input signal at a neural network and computing with the neural network, based on said at least samples of the electrical input signal, an acoustic feedback event classification of whether an acoustic seal configured to acoustically separate said environment microphone from a speaker when the acoustic insulator is fitted into an ear canal succeeded in avoiding an acoustic feedback or not,
    c. receiving said electrical input signal at a processing unit, and processing said electrical input signal with the processing unit, resulting in an electrical output signal and, based on the acoustic feedback event classification, forwarding said electrical output signal to said speaker and
    d. converting said electrical output signal into an output sound signal with a speaker.

12. The method of claim 11 wherein said acoustic feedback event classification is computed on a sample of said electrical input signal with constant timespan.

13. The method of claim 11, further comprising: obtaining, by training said neural network, a set of parameters that minimizes misclassification of the acoustic feedback event classification.

14. The method of claim 13, wherein said set of parameters is updated.

15. The method of claim 11, further comprising: generating a notification in case said acoustic feedback event classification corresponds to the acoustic seal not succeeding in avoiding the acoustic feedback.

16. The method of claim 11, wherein said electrical input signal is provided to said processing unit based on an input of a user on an input interface.

17. The method of claim 11, further comprising: generating by the processing unit a user notification based on said acoustic feedback event classification and forwarding said user notification to said speaker so as to be output by the speaker.

18. The method of claim 11, wherein said acoustic feedback event classification is a binary classification, and a network structure of said neural network is specified before computing said binary classification.

* * * * *